United States Patent [19]

Naganuma

[11] Patent Number: 5,754,225
[45] Date of Patent: May 19, 1998

[54] VIDEO CAMERA SYSTEM AND AUTOMATIC TRACKING METHOD THEREFOR

[75] Inventor: Kazuto Naganuma, Tokyo, Japan

[73] Assignee: Sony Corporation, Tokyo, Japan

[21] Appl. No.: 721,375

[22] Filed: Sep. 26, 1996

[30] Foreign Application Priority Data

Oct. 5, 1995 [JP] Japan .................. 7-284539

[51] Int. Cl.$^6$ .................................. H04N 7/18
[52] U.S. Cl. .................. 348/155; 348/169; 348/700
[58] Field of Search .......................... 348/155, 154, 348/143, 169, 170, 171, 172, 700, 61; H04N 7/18

[56] References Cited

U.S. PATENT DOCUMENTS 3,988,533 10/1976 Mick et al. .................. 348/155
4,198,653 4/1980 Kamin ....................... 348/155
5,552,823 9/1996 Kageyama ................... 348/155

Primary Examiner—Bryan S. Tung
Attorney, Agent, or Firm—Frommer Lawrence & Haug LLP; William S. Frommer

[57] ABSTRACT

The invention provides a video camera system such as a supervisory system wherein the amount of calculation for motion detection is reduced to reduce the required capacity for hardware. An output of a video camera is sent to a data processing apparatus. In the data processing apparatus, an evaluation value calculation block extracts a video signal of each of a plurality of areas and calculates an evaluation value of the image for each of the areas. Further, a microcomputer calculates a reference value based on the evaluation value obtained in an ordinary state and stores the reference value, and then compares the reference value with a current evaluation value to detect motion of the image. Further, the microcomputer controls the position of the video camera so that the area in which the motion has been detected may be positioned at a central portion of the field of view of the video camera.

13 Claims, 9 Drawing Sheets

F I G. 1
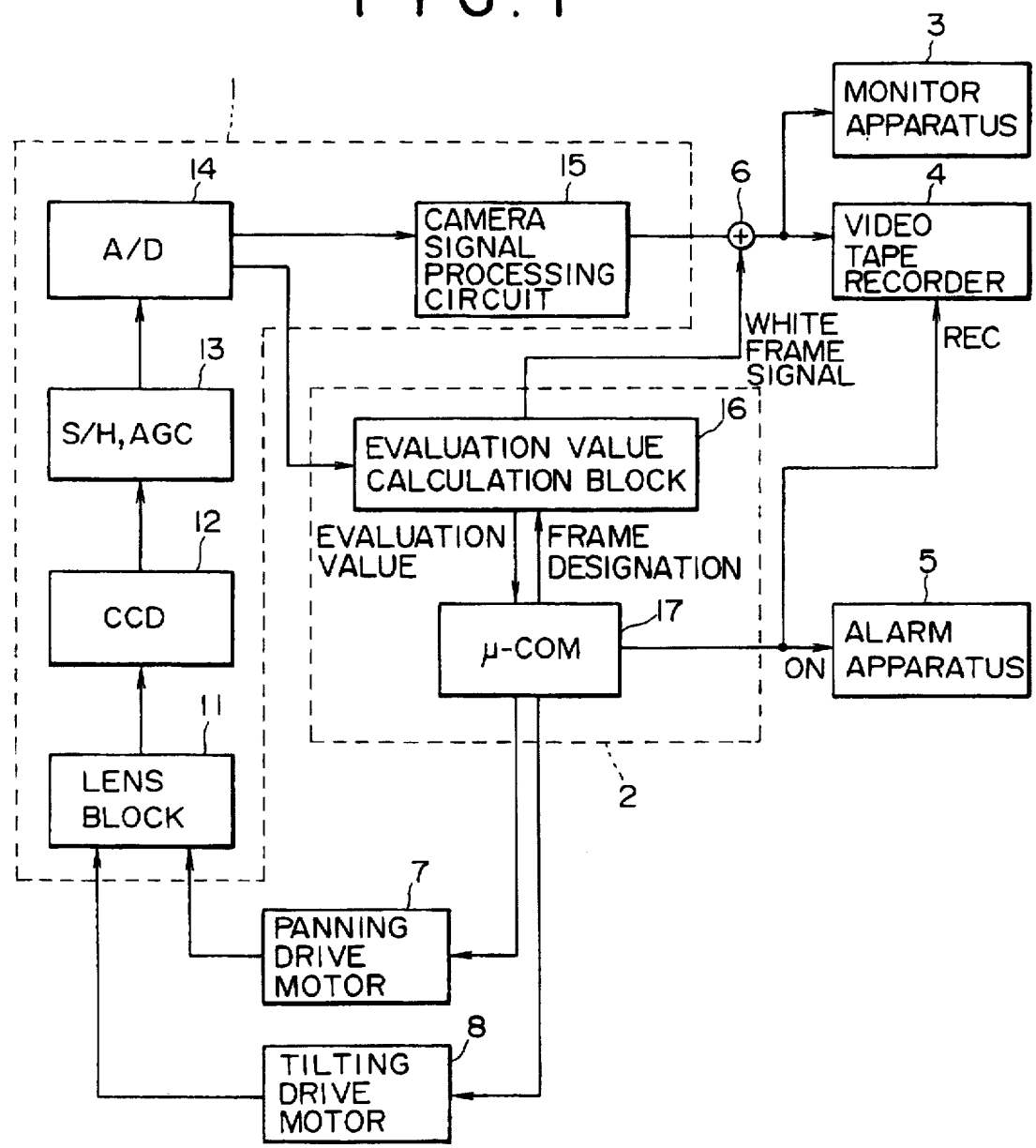

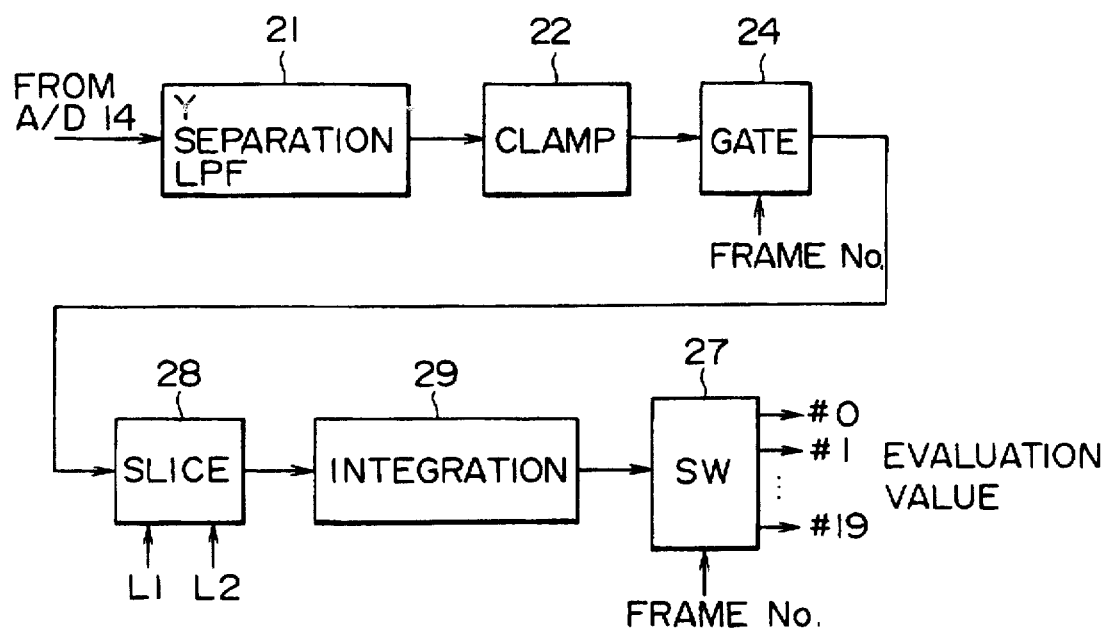
F I G. 4
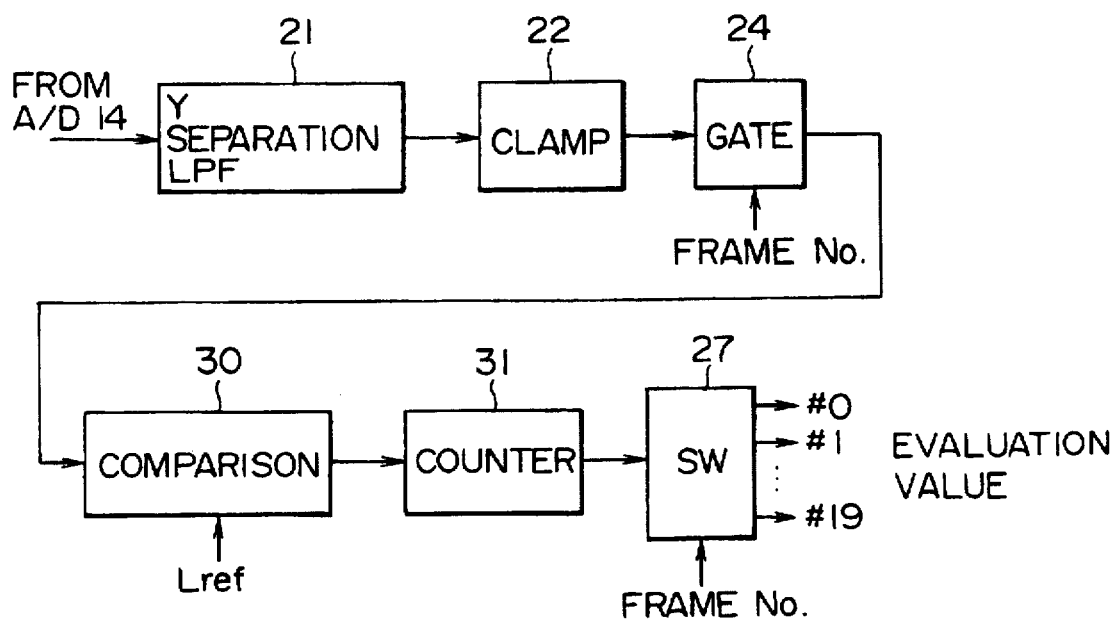
F I G. 5

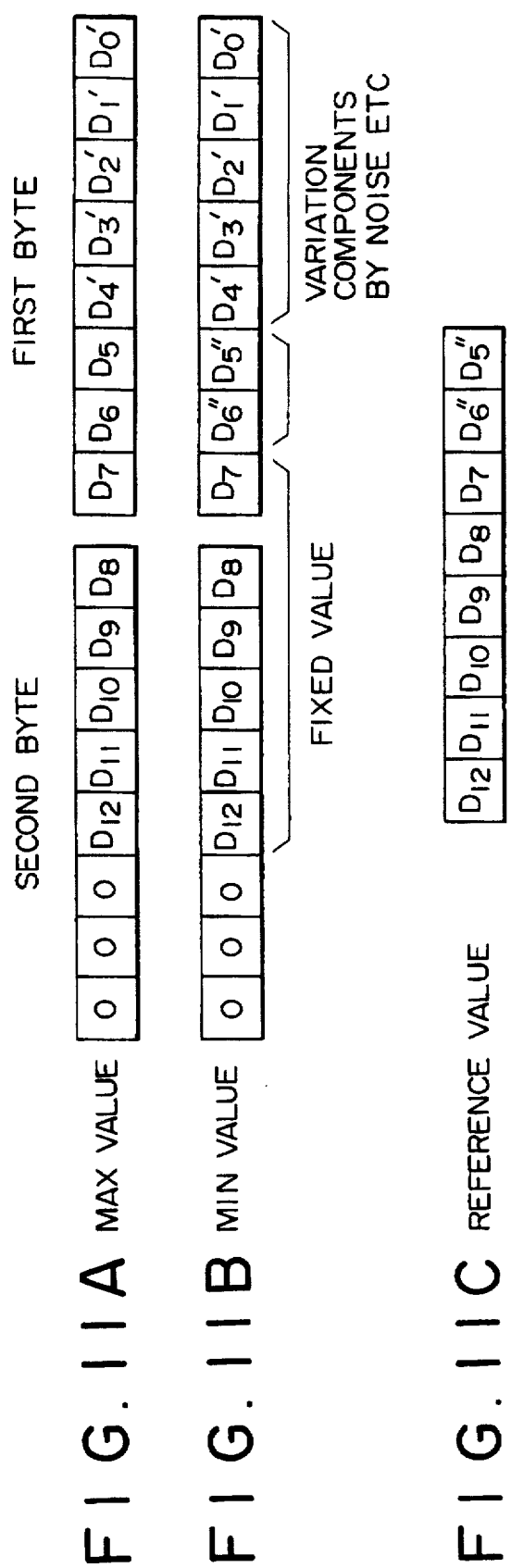

VIDEO CAMERA SYSTEM AND AUTOMATIC TRACKING METHOD THEREFOR

BACKGROUND OF THE INVENTION

This invention relates to a video camera system such as, for example, a supervisory system which employs a television camera, and more particularly to a video camera system and an automatic tracking method therefor wherein motion of a photographic object in the field of view of a video camera is detected to allow the video camera to automatically track the motion of the photographic object.

A video camera system is known wherein a supervisory area is imaged by a video camera and, when some abnormal situation occurs in the supervisory area, an alarm apparatus is activated. In a video camera system of the type mentioned, while occurrence of an abnormal situation is detected by detecting motion of a photographic object imaged by the video camera, the motion of the photographic object is usually detected using a method wherein difference values at same addresses of an image of a current field and another image of a preceding field are calculated and converted into absolute values and then integrated over the entire field to discriminate whether or not some motion is involved.

However, while the usual motion detection method just described is advantageous in that it is superior in accuracy in detection, it is disadvantageous in the following points (1) to (5).

(1) Since calculation of a large scale or amount is involved, a high cost is required to implement the motion detection apparatus.

(2) Motion detection is difficult when a moving object is deformed, rotated, or moved toward or away from the motion detection apparatus.

(3) Motion detection is difficult when a moving object exhibits a large amount of instantaneous motion.

(4) Motion detection is difficult when a moving object has a repeat pattern.

(5) Motion detection is difficult when a moving object partially overlaps with a stationary object therearound.

SUMMARY OF THE INVENTION

It is an object of the present invention to provide a video camera system and an automatic tracking method therefor wherein, overcoming the disadvantages of the related art motion detection method described above, the amount of calculation for motion detection is reduced to reduce the required capacity for hardware.

According to an aspect of the present invention, there is provided a video camera system, comprising an imaging apparatus, and a data processing apparatus for processing data using an output of the imaging apparatus, the data processing apparatus including an extraction means for extracting a video signal of each of a plurality of areas of an image, a calculation means for calculating an evaluation value of the image for each of the areas using an output of the extraction means, a storage means for calculating a reference value based on the evaluation value obtained in an ordinary state and storing the reference value, a detection means for comparing the reference value stored in the storage means with a current evaluation value for each of the areas to detect motion of the image, and a control means for controlling a position of the imaging apparatus so that, when the detection means detects motion of the image, the area in which the motion has been detected may be positioned at a central portion of the field of view of the imaging apparatus.

In the video camera system, the output of the imaging apparatus is sent to the data processing apparatus. In the data processing apparatus, the extraction means extracts a video signal of each of a plurality of areas of an image, and the calculation means calculates an evaluation value of the image for each of the areas using an output of the extraction means. Further, the storage means calculates a reference value based on the evaluation value obtained in an ordinary state and stores the reference value, and the detection means compares the reference value stored in the storage means with a current evaluation value for each of the areas to detect motion of the image. Then, the control means controls the position of the imaging apparatus so that the area in which the motion has been detected may be positioned at a central portion of the field of view of the imaging apparatus.

The calculation means may include a means for integrating peak values of a horizontal direction from the output of the extraction means in a vertical direction.

The data processing apparatus may further include an updating means for updating the reference value stored in the storage means in response to a variation of the evaluation value of each of the areas in an ordinary state.

According to another aspect of the present invention, there is provided an automatic tracking method for a video camera system which includes an imaging apparatus, and a data processing apparatus for processing data using an output of the imaging apparatus, comprising the steps of extracting a video signal for each of a plurality of areas of the field of view of the imaging apparatus, calculating an evaluation value of an image for each of the areas based on the video signal, calculating a reference value based on the evaluation value of the image for each of the areas in an ordinary state, storing the reference value, comparing the reference value with a current evaluation value to detect motion of the image, and controlling a position of the imaging apparatus so that the area in which the motion has been detected may be positioned at a central portion of the field of view of the imaging apparatus.

With the video camera system and the automatic tracking method therefor, the following advantages can be anticipated.

(1) Since the scale or amount of calculation required for motion detection is small, the capacity of hardware is reduced. Consequently, a video camera system can be constructed at a low cost.

(2) Even if a moving object is deformed, rotated, or moved toward or away from the video camera system, such motion of the moving object can be detected.

(3) Even when a moving object exhibits a large amount of instantaneous motion, the motion can be detected.

(4) Even when a moving object has a repeat pattern, motion of the moving object can be detected.

(5) Even when a moving object partially overlaps with a stationary object therearound, motion of the moving body can be detected.

(6) Even if steady motion is present in a portion of a screen, the motion can be detected.

(7) Such a situation that only variation of an image of a low luminance portion or variation in light amount occurs partially can be detected with a high degree of accuracy.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 1 is a block diagram showing a general construction of a video camera system to which the present invention is applied;

FIG. 4 is a block diagram showing another form of the evaluation value calculation block of the video camera system of FIG. 1;

FIG. 5 is a block diagram showing a further form of the evaluation value calculation block of the video camera system of FIG. 1;

FIGS. 11A to 11C are diagrammatic views illustrating data structures of the reference value to be stored into the motion detection section of FIG. 10.

DESCRIPTION OF THE PREFERRED EMBODIMENT

Figure 2:
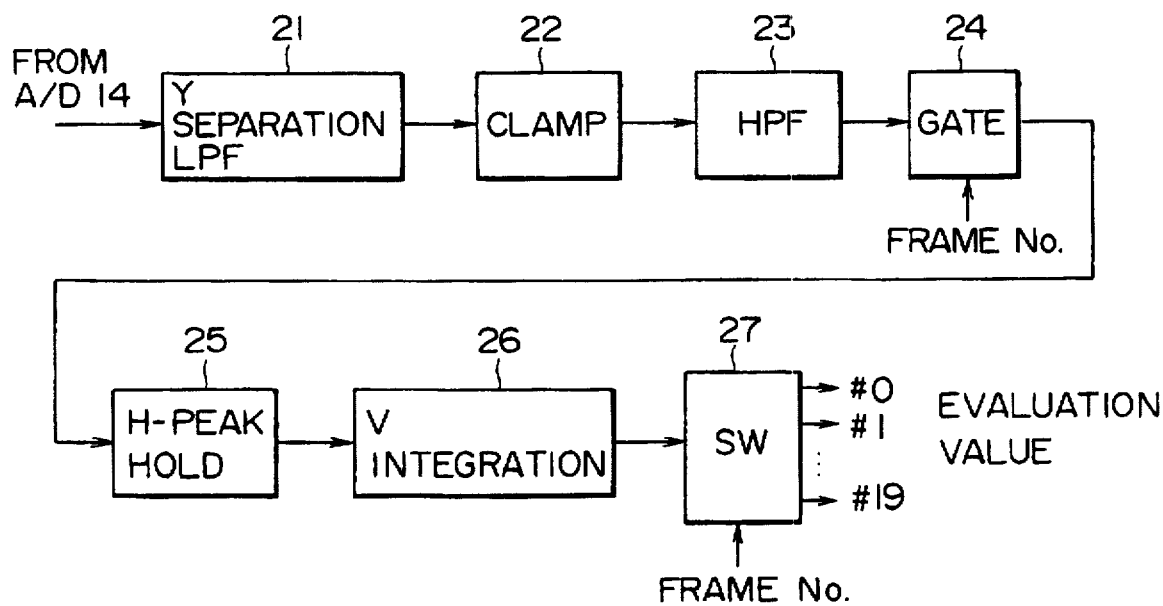
FIG. 2 is a block diagram showing a form of an evaluation value calculation block of the video camera system of FIG. 1.

<1> Video camera system to which the present invention is applied

FIG. 1 shows in block diagram a general construction of a video camera system to which the present invention is applied. Referring to FIG. 1, the video camera system shown includes a video camera 1 for imaging a supervisory area, a data processing apparatus 2 for detecting motion of a photographic object in the supervisory area from a video signal from the video camera 1, a monitor apparatus 3 for displaying an output of the video camera 1, a video tape recorder 4 for recording the output of the video camera 1, an alarm apparatus 5 for performing an alarming operation in response to an output of the data processing apparatus 2, a composing circuit 6 for composing a blank frame signal produced by the data processing apparatus 2 with the output of the video camera 1, a panning drive motor 7 for panning the video camera 1 in response to another output of the data processing apparatus 2, and a tilting drive motor 8 for tilting the video camera 1 in response to a further output of the data processing apparatus 2.

The video camera 1 includes a lens block 11, a CCD (charge coupled device) 12 for converting an optical image from a photographic object, which has passed through the lens block 11, into a video signal, a sample/hold and AGC circuit 13 for sample holding an output of the CCD 12 and adjusting the gain, an analog to digital conversion circuit 14 for converting an output of the sample/hold and AGC circuit 13 into a 10-bit digital signal, and a camera signal processing circuit 15 for performing predetermined camera signal processing for an output of the analog to digital conversion circuit 14.

The data processing apparatus 2 includes an evaluation value calculation block 16 for calculating an evaluation value of a photographic object using digital data transmitted thereto from the analog to digital conversion circuit 14 of the video camera 1, and a microcomputer 17 for detecting motion of the photographic object from the evaluation value received from the evaluation value calculation block 16.

If the microcomputer 17 detects motion of the photographic object, then it develops a recording instruction to the video tape recorder 4 and develops an operation instruction to the alarm apparatus 5. As a result, if motion is involved the photographic object in a screen, then the alarm apparatus 5 operates and a video signal of the photographic object is recorded.

Further, the microcomputer 17 develops a signal, which designates one of a plurality of divisional areas (hereinafter referred to as frames) obtained by dividing one screen, to the evaluation value calculation block 16. The evaluation value calculation block 16 calculates an evaluation value in the designated frame and sends the calculated evaluation value to the microcomputer 17. Further, when a signal representing that the photographic object exhibits some motion is received from the microcomputer 17, the evaluation value calculation block 16 produces a blank frame signal for designation of the frame and outputs the blank frame signal to the composing circuit 6.

Further, if the microcomputer 17 detects some motion of the photographic object, it develops driving control signals to the panning drive motor 7 and the tilting drive motor 8 so that the photographic object may be positioned at a central portion of the field of view of the video camera 1. In response to the driving control signals, the panning drive motor 7 and the tilting drive motor 8 drive the lens block 11 of the video camera 1.

Details of the data processing apparatus 2 described above will be hereinafter described.

<2> Construction of the Evaluation Value Calculation Block (Part 1)

FIG. 2 shows a form of the construction of the evaluation value calculation block 16. Referring to FIG. 2, the evaluation value calculation block shown includes a low-pass filter 21 for separating a Y signal from 10-bit digital data outputted from the analog to digital conversion circuit 14 described above, a clamp circuit 22 for clamping the Y signal separated by the low-pass filter 21, and a high-pass filter 23 for detecting an edge component from an output of the clamp circuit 22. The cut-off frequency of the high-pass filter 23 is set, for example, to approximately 100 kHz taking it into consideration that an edge of a photographic object of a low luminance may be extracted.

The evaluation value calculation block further includes a gate circuit 24 for extracting a signal in a predetermined frame, a H-peak hold circuit 25 for holding a peak value of an output signal of the gate circuit 24 in a horizontal direction, and a V integration circuit 26 for integrating an output of the H-peak hold circuit 25 in a vertical direction.

Here, an example of a frame from which a signal is detected by the gate circuit 24 described above will be described. Here, a range of substantially 200° in a horizontal direction is set as a supervisory area. Then, the supervisory area is divided horizontally into 20 sub-areas to provide frames #0, #1, #2, . . . , #19. An area within which the video camera can supervise in its stopping condition corresponds to five frames. Thus, the video camera is panned to allow supervision over the range of 0° to 190°.

Figure 3:
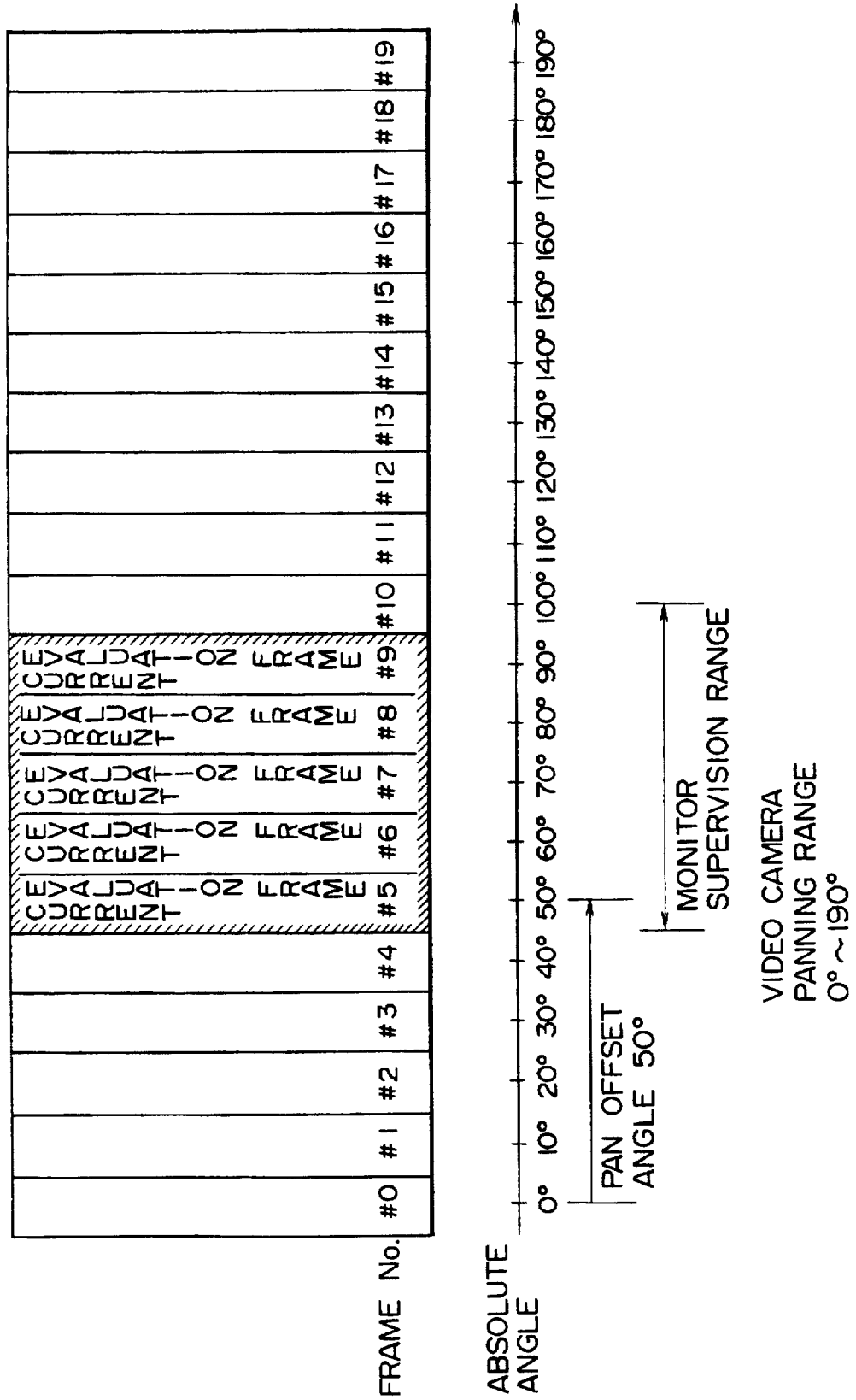
FIG. 3 is a schematic view showing an example of a frame construction.

The gate circuit 24 extracts video data in five frames, which are supervised at a time by the video camera, for each one field successively beginning with the left end of the supervisory area. For example, when video data of the frames #5 to #9 are to be extracted as seen in FIG. 3, the video data of the frame #5 at the left end are extracted in the first field, and then, in the next field, the video data of the frame #6 are extracted. Accordingly, the video data of the frame #9 at the right end are extracted in the fifth field.

Referring back to FIG. 2, the evaluation value calculation block of FIG. 2 further includes a switching circuit 27 for selectively outputting an output of the V integration circuit 26 for each frame.

The H-peak hold circuit 25 detects and holds a peak value for each line in each frame and outputs the peak value to the V integration circuit 26. The H-peak hold circuit 25 may be constructed such that it may hold and output not one peak value but two or three peak values. The V integration circuit 26 integrates such horizontal peak values in the vertical direction for each frame. The switching circuit 27 outputs an output of the V integration circuit 26 as an evaluation value for each frame to the microcomputer 17. The evaluation value is formed from, for example, 2-byte data. Here, #0 to #N annexed to the outputs of the switching circuit 27 are the numbers of the individual frames (in the arrangement shown in FIG. 3, N=19).

It is to be noted that, from within the evaluation value calculation block described above, the gate circuit 24 and the components following the gate circuit 24 can be constructed by software.

<3> Construction of the Evaluation Value Calculation Block (Part 2)

FIG. 4 is a block diagram showing another form of the construction of the evaluation value calculation block 16. Referring to FIG. 4, the evaluation value calculation block shown is a modification to and is different from the evaluation value calculation block described above with reference to FIG. 2 in that it includes a slice circuit 28 and an integration circuit 29 in place of the H-peak hold circuit 25 and the V integration circuit 26 of FIG. 2. Further, the evaluation value calculation block does not include the high-pass filter 23.

The slice circuit 28 outputs an input signal thereto only when the output level of the gate circuit 24 is included between two predetermined slice levels L1 and L2. Those slice levels are set, for example, when the black level and the white level of the Y signal of a low luminance portion are 0 and 100, respectively, for example, approximately to L1=0 and L2=25. In other words, the integration circuit 29 integrates video data of a low luminance portion for each frame. This enhances the capability of detecting motion of a photographic object in a low luminance portion.

<4> Construction of the Evaluation Value Calculation Block (Part 3)

FIG. 5 shows in block diagram a further form of the construction of the evaluation value calculation block 16. Referring to FIG. 5, the evaluation value calculation block shown is another modification to and is different from the evaluation value calculation block described hereinabove with reference to FIG. 2 in that it includes a comparison circuit 30 and a counter 31 in place of the H-peak hold circuit 25 and the V integration circuit 26. Further, the evaluation value calculation block does not include the high-pass filter 23.

The comparison circuit 30 outputs an input signal thereto only when the output level of the gate circuit 24 is higher than a predetermined reference level Lref. The reference level is set, for example, where the block level and the white level of the Y signal of a high luminance portion are 0 and 100, respectively, for example, to approximately 75. Consequently, the counter 31 counts the number of pixels in a high luminance portion for each frame. This enhances the capability of detecting a situation wherein a photographic object itself does not exhibit any motion and only variation in light amount occurs partially.

While the three different constructions of the evaluation value calculation block are described above, the evaluation value calculation block shown in FIG. 2 may be combined with one of the other two evaluation value calculation blocks. For example, where the evaluation value calculation block shown in FIG. 2 and the evaluation value calculation block shown in FIG. 4 are prepared, when the evaluation value of the evaluation value calculation block shown in FIG. 4 is higher than a predetermined threshold value, that is, when the photographic object in the frame exhibits a low luminance, the evaluation value of the evaluation value calculation block shown in FIG. 4 may be used, but in any other case, the evaluation value of the evaluation value calculation block shown in FIG. 2 may be used.

<5> Construction of the Motion Detection Section of the Microcomputer (Part 1)

Figure 6:
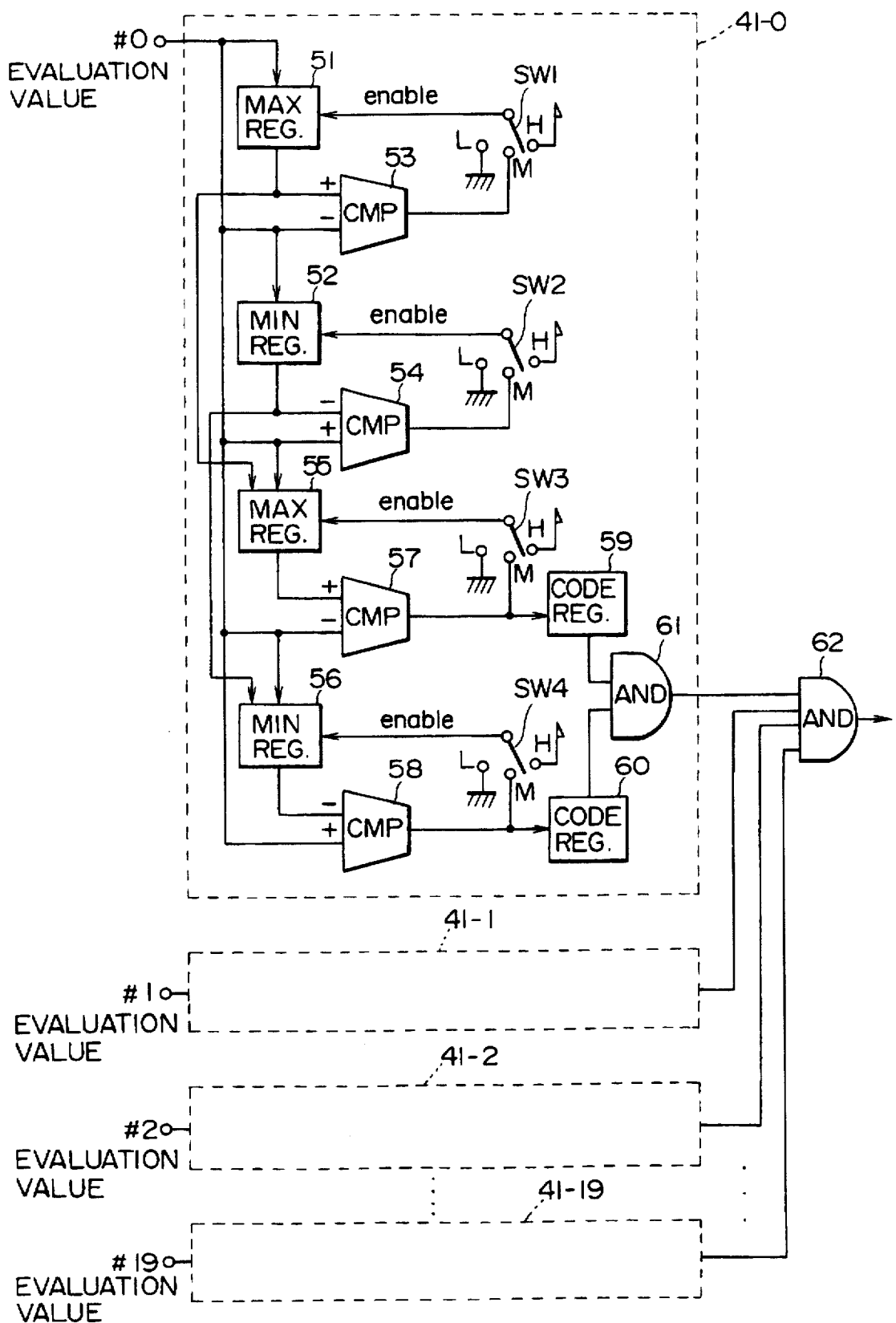
FIG. 6 is a block diagram showing a form of a construction for one channel of a motion detection section of a microcomputer of the video camera system of FIG. 1.

FIG. 6 shows a construction of a motion detection section of the microcomputer 17. As seen from FIG. 6, the microcomputer 17 is constructed such that it performs motion detection for each frame. In FIG. 6, an internal construction only of a block 41-0 for detection of motion of the frame 0.

Each of motion detection blocks 41-0 to 41-N includes a first maximum value register 51, a first minimum value register 52, a first comparator 53 which compares a value stored in the first maximum value register 51 with an evaluation value currently inputted to the motion detection block, and a second comparator 54 which compares a value stored in the first minimum value register 52 with the currently inputted evaluation value.

Each of the motion detection blocks 41-0 to 41-N further includes a second maximum value register 55, a second minimum value register 56, a third comparator 57 which compares a value stored in the second maximum value register 55 with an evaluation value currently inputted to the motion detection block, and a fourth comparator 58 which compares a value stored in the second minimum value register 56 with the currently inputted evaluation value.

Each of the motion detection blocks 41-0 to 41-N further includes switching circuits SW1 to SW4, a first code register 59 for storing a code of an output of the third comparator 57, a second code register 60 for storing a code of an output of the fourth comparator 58, and an AND gate 61 for logically ANDing outputs of the first and second code registers 59 and 60.

Each of the switching circuits SW1 to SW4 is formed as a three-state position switch. Each of the maximum value registers and the minimum value registers stores an evaluation value when a corresponding one of the switching circuits SW1 to SW4 is connected to the L (low) level. Further, the second maximum value register 55 stores a value obtained by adding a predetermined value α to a value of the first maximum value register 51 at a predetermined timing (details will be hereinafter described). As a result, the value of the second maximum value register 55 is updated at the predetermined timing. Similarly, the second minimum value register 56 stores a value obtained by subtracting another predetermined value β from the value of the first minimum value register 52 at another predetermined timing. The first and second code registers 59 and 60 always remain in a holding state except when they store the outputs of the third and fourth comparators 57 and 58, respectively.

The AND gate 61 outputs a signal representing that the photographic object in a frame exhibits some motion when one of the outputs of the first and second code registers 59 and 60 is at the L level. Outputs of the motion detection blocks 41-0 to 41-N are sent to another AND gate 62. When the output of the AND gate 62 is at the L level, it represents that the photographic object in the screen exhibits some motion, but when it is at the H level, it represents that the photographic object in the screen exhibits no motion. In short, when the photographic object in at least one of the frames exhibits some motion, it is determined that the photographic object in the screen exhibits some motion.

While the construction of the motion detection section described above except the maximum value registers 51 and 55, minimum value registers 52 and 56, and code registers 59 and 60 is formed by software of the microcomputer, they may otherwise be formed by hardware logic circuits.

<6> Flow of the Motion Detection Processing (Part 1)

Figure 7:
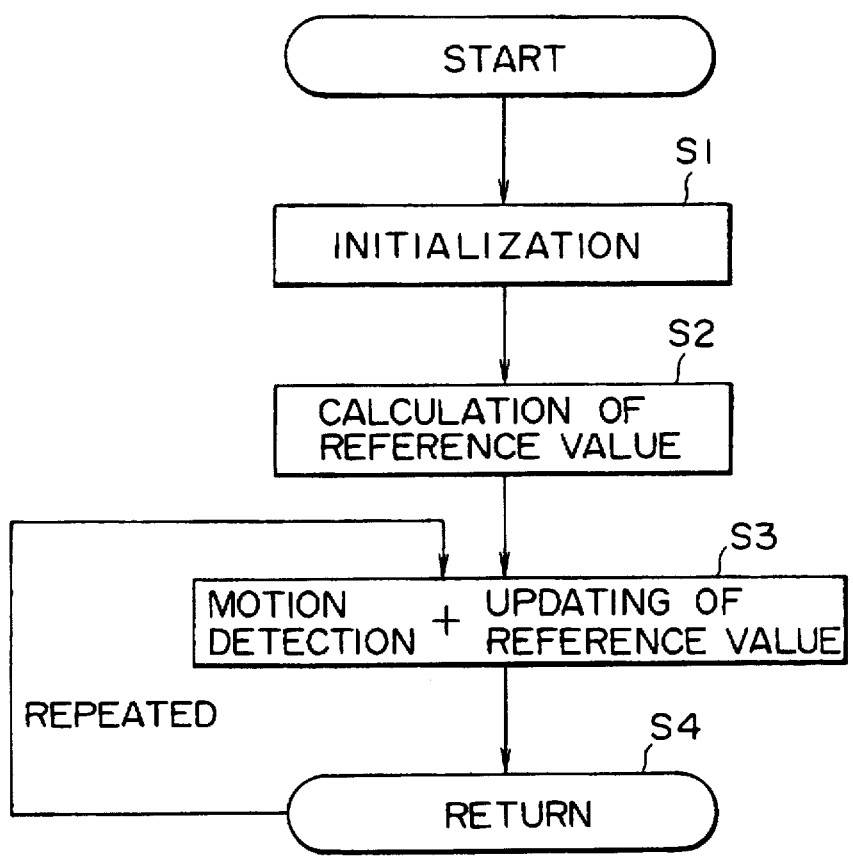
FIG. 7 is a flow chart illustrating a general flow of automatic tracking processing of the video camera system of FIG. 1.

Now, a general flow of the motion detection processing will be described with reference to the flow chart of FIG. 7. Here, operations in steps S1 and S2 are performed when the supervisory area is in a regular condition. In other words, a user will supervise the screen of the monitor apparatus 3 and executes the operations in steps S1 and S2 while confirming that no abnormal situation is detected.

First, initialization is performed in step S1. Here, setting of the cutoff frequency of the HPF of FIG. 2 where the cutoff frequency is switchable, setting of the number of peaks (one, three or the like) of the H-peak hold circuit of FIG. 2, setting of whether the motion detection block of FIG. 2 should be used by itself or should be combined with the motion detection block of FIG. 4 or 5 and so forth are performed. Further, the panning offset angle is set to 0°.

Then, in step S2, the following operations (1) to (11) are performed to calculate a reference value for motion detection.

(1) A reference value setting/updating counter (not shown) is set to 0.

(2) The switching circuits SW1 and SW2 of the block 41-0 are set to the L positions, and the evaluation value of the frame #0 is stored into the first maximum value register 51 and the first minimum value register 52. In this instance, the value of the first maximum value register 51 and the value of the first minimum value register 52 are equal to each other.

(3) The processing described in paragraph (2) above is performed for each one field for the blocks 41-1 to 41-4. After the processing for the block 41-4 is completed, the reference value setting/updating counter is incremented by one. The processing described above is performed while the video camera remains fixed.

(4) The switching circuits SW1 and SW2 of the block 41-0 are set to the M positions so that the evaluation value of the frame #0 is inputted to the first comparator 53 and second comparator 54. When the evaluation value is higher than the value of the first maximum value register 51, the output of the first comparator 53 exhibits the L level. In this instance, the value of the first maximum value register 51 is updated with the evaluation value. On the other hand, when the evaluation value is lower than the value of the first minimum value register 52, the output of the second comparator 54 exhibits the L level. In this instance, the value of the first minimum value register 52 is updated with the evaluation value. When the evaluation value is between the value of the first maximum value register 51 and the value of the first minimum value register 52, the values of the first maximum value register 51 and first minimum value register 52 are not updated.

(5) The processing described in paragraph (4) above is performed for each one field for the blocks 41-1 to 41-4. Then, after the processing for the block 41-4 is completed, the reference value calculation/updating counter is incremented by one.

(6) The operations described in paragraphs (4) and (5) above are repeated until the value of the reference value calculation/updating counter reaches a predetermined value m. Thereafter, a value obtained by adding the predetermined value α to the value of the first maximum value register 51 is stored as a reference value into the second maximum value register 55, and another value obtained by subtracting the predetermined value β from the value of the first minimum value register 52 is stored as another reference value into the second minimum value register 56. Then, the switching circuits SW1 to SW4 are set to the H level so as to hold the values of the individual registers. Also for the blocks 41-1 to 41-4, the same processing is successively performed for each one field. It is to be noted that the operations are performed successively by m times for the block 41-0 and then the operations are performed successively by m times for the block 41-1, whereafter the operations are performed successively by m times for the individual blocks 41-2, 41-3 and 41-4.

(7) After the processing described in paragraph (6) is completed, the reference value calculation/updating counter is reset to 0. Then, a driving control signal is applied to the panning drive motor 7 to turn the video camera 1 so that the panning offset angle of the video camera 1 may be equal to 50°.

(8) The operations described in paragraphs (2) to (6) above are performed successively for the blocks 41-5 to 41-9.

(9) After the processing described in paragraph (8) is completed, the reference value calculation/updating counter is reset to 0, and the panning offset angle of the video camera 1 is set to 100°. Thereafter, the operations described in paragraphs (2) to (6) are performed successively for the blocks 41-10 to 41-14.

(10) After the processing described in paragraph (9) is completed, the reference value calculation/updating counter is reset to 0, and the panning offset angle of the video camera 1 is set to 150°. Thereafter, the operations described in paragraphs (2) to (6) are performed successively for the blocks 41-15 to 41-19.

(11) After holding of the values of the registers is completed for all of the motion detection blocks 41-0 to 41-19, the values of the code registers 59 and 60 of all of the blocks 41-0 to 41-19 are set to 0.

In next step S3, basically by discriminating whether or not the evaluation value of each frame remains within a predetermined range from each of the reference values, motion of the photographic object is detected for each frame, and when some motion is detected, automatic tracking is performed so that the photographic object may be positioned at a central portion of the supervisory area. However, for example, where the supervisory area is outdoors, since the luminance of the photographic object in the supervisory area is varied by a variation of the sunshine, if the reference values remain fixed, then the luminance variation may be detected as motion of the photographic object.

Figure 8:
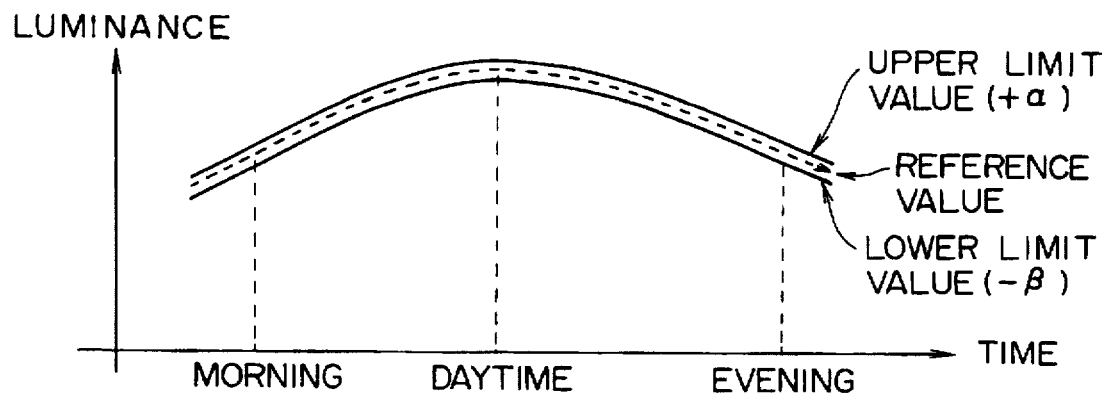
FIG. 8 is a diagram illustrating a manner wherein a reference value is varied in accordance with a variation of the luminance by a variation of the sunshine.
Figure 9:
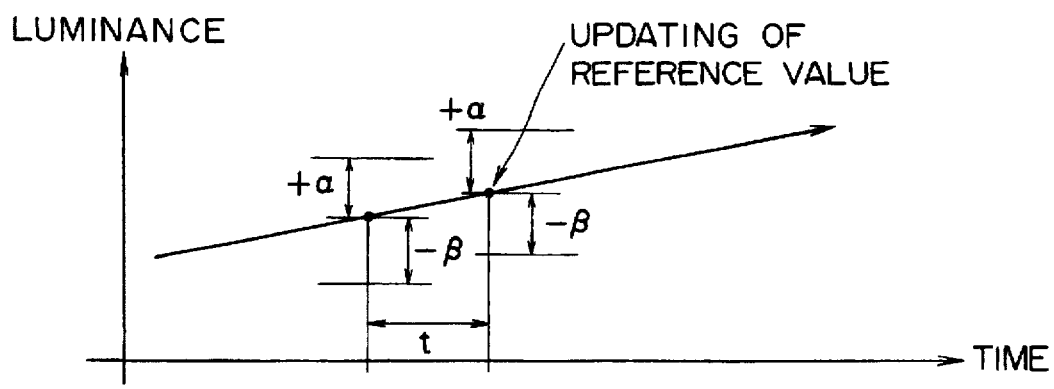
FIG. 9 is a diagram illustrating a manner wherein the reference value is updated after each predetermined interval of time.

Therefore, when the photographic object in the supervisory area exhibits no motion, the reference values are varied in response to the luminance as seen in FIG. 8 to prevent such erroneous detection as described above. More particularly, the reference values are updated, for example, after each predetermined time t as seen from FIG. 9. It is to be noted that, in FIGS. 8 and 9, a single reference value (maximum value=minimum value) is shown for the convenience of illustration.

Updating of the reference values and automatic tracking are performed by performing the operations described in paragraphs (1) to (21) below in step S3. In step S3, motion of the photographic object is detected while the video camera 1 is panned from the left end to the right end of the supervisory area, and after the right end is reached, the video camera 1 is panned now from the right end to the left end to detect motion of the photographic object. In the description given below, processing is started from a situation wherein the video camera 1 stops at the panning offset angle of 50° as seen in FIG. 3 after it is panned from the left end of the supervisory area. Here, the value of the reference value calculation/updating counter is 0.

(1) An evaluation value for the frame #5 is inputted to perform motion detection.

(2) The evaluation value of the frame #5 is compared with the reference values for the frame #5. If the result of comparison reveals that the evaluation value of the frame #5 is higher than the reference value of the second maximum value register 55, then the output of the third comparator 57 exhibits the L level. Or, when the evaluation value is lower than the reference value of the second minimum value register 56, the output of the fourth comparator 58 exhibits the L level. In those instances, the output of the AND gate 61 exhibits the L level, and consequently, also the output of the AND gate 62 exhibits the L level. Consequently, it is determined that motion is exhibited in the frame #5. On the other hand, if the value of the second minimum value register 56≦the current evaluation value≦the value of the second maximum value register 55, then it is determined that no motion is exhibited in the frame #5.

(3) If it is determined that some motion is exhibited, then an instruction to cause the monitor apparatus 3 to display the frame #5, in which motion has been detected, blinking with a blank frame, another instruction to turn the alarm apparatus 5 on and a further instruction to place the video tape recorder 4 into a recording mode are outputted. On the contrary if it is determined that no motion is exhibited, then the evaluation value of the frame #5 is stored into the first maximum value register 51 and the first minimum value register 52.

(4) The processing described in paragraphs (2) and (3) above is performed for the frame #6 in a next field. Thereafter, the processing described in paragraphs (2) and (3) is successively performed for the frames #7, #8 and #9 for each one field period.

In the following, different operations are described separately depending upon whether or not motion has been detected.

[A] When Motion Has Been Detected (5) The motion detection processing is performed successively for the frames #5 to #9, and it is assumed here that motion has been detected in the frames #5 and #6 and no motion has been detected in the frames #7 to #9. In order to cause a moving body to be displayed at a central portion of the field of view of the monitor apparatus 3, an angular difference between the central portion of the field of view of the monitor apparatus 3 and the moving body is detected, and processing is performed so as to reduce the angular difference to 0.

In particular, since the microcomputer 17 recognizes that the central portion of the field of view of the monitor apparatus 3 is the frame #7, calculation of $$\{(5-7)+(6-7)\}/2 = -3/2 \rightarrow -1$$

is performed to determine a panning frame number (angle) of the video camera. It is to be noted that the denominator of the expression above is the number of frames in which motion has been detected. In this instance, fractions are ignored.

If the sign of a value obtained by the calculation is the negative, then the video camera 1 is panned toward the frame #0, but if it is the positive, then the video camera 1 is panned toward the frame #19. Accordingly, in this instance, the video camera 1 is panned by an angle corresponding to one frame (here, 10°) toward the frame #0. Here, where the panning drive motor 7 is formed from a stepping motor, a predetermined number of pulses are counted. Where the panning drive motor 7 is formed from a dc motor, an angular velocity sensor is provided for the video camera 1, and the output of the angular velocity sensor is integrated to calculate the panning angle. It is to be noted that the display of a blank frame is continued during the panning.

(6) After the field of view of the monitor apparatus 3 is changed to the frames #4 to #8 as a result of the operation described in paragraph (5) above, motion detection is performed one by one frame for each one field similarly to the frames #5 to #9 described above.

(7) If the result of motion detection described above reveals that motion has been detected in the frames #4, #5 and #6 whereas no motion has been detected in the frames #6 and #7, then calculation of $$\{(4-6)+(5-6)+(6-6)\}/3 = -3/3 = -1$$

is performed to calculate the panning angle.

(8) The video camera 1 is panned by an angle corresponding to one frame (10°) toward the frame #0.

It is to be noted that, when frames in which motion has been detected are separate in a plurality of blocks, the field of view of the monitor apparatus 3 is displaced toward that one of the blocks which includes a maximum number of adjacent frames. However, where such frames are separate in three or more blocks, preferably the field of view of the monitor apparatus 3 is not moved because otherwise a long period of time is required for the calculation.

[B] When No notion Has Been Detected (9) If it is determined that no motion is exhibited in any of the frames #5 to #9, a driving control signal is applied to the panning drive motor 7 so that the video camera 1 may be moved by an angle (here, 10°) corresponding to one frame toward the frame #10.

(10) The video camera 1 is stopped at a position where the panning offset angle is 60°.

(11) The count value of the counter for counting the number of a frame from which motion detection is to be started is incremented by one to #6. The processing described in paragraph (2) above is performed for the frame #6 to discriminate whether or not some motion is detected.

(12) If it is discriminated that no motion is detected in the frame #6, then it is successively discriminated for the frames #7, #8, #9 and #10 whether or not motion is detected for each one field period. Then, if it is determined that no motion is detected in any of the frames #6 to #10, then the video camera 1 is panned by an angle corresponding to one frame toward the frame #11 and similar processing to that described above is performed.

(13) If no motion is detected while the video camera 1 is panned until the field of view of the monitor apparatus 3 comes to the frames #15 to #19 in the right end supervisory area, a driving control signal is applied to the panning drive motor 7 so that the field of view of the monitor apparatus 3 may come to the frames #14 to #18.

(14) The panning drive motor 7 is stopped when the video camera 1 is turned to the target position.

(15) The count value of the counter for counting the number of the frame from which motion detection is to be started is decremented by one to #14.

(16) Thereafter, processing similar to that described above is repeated.

Subsequently, processing of updating the reference values for each frame in order to compensate for a variation of the reference values caused by a variation of the sunshine will be described.

(17) As described in connection with the operation in paragraph (3) above, if no motion is detected when the value of the reference value calculation/updating counter is 0, an evaluation value of each frame then is stored into the first maximum value register 51 and the first minimum value register 52. Here, if no motion is detected in any of the frames #0 to #19, the count value of the reference value calculation/updating counter is incremented by one.

(18) Similarly, motion is detected for each frame while the count value of the reference value calculation/updating counter is 1. Then, if it is determined that some motion is involved in one of the frames, then processing for displaying the frame blinking with a blank frame, processing of rendering the alarm apparatus operative and processing for putting the video tape recorder into a recording mode are performed in parallel. On the contrary if it is determined that no motion is involved, the switching circuits SW1 and SW2 are set to the M positions so that the current evaluation value is compared with the reference values of the first maximum value register 51 and the first minimum value register 52.

If the result of comparison reveals that the evaluation value is higher than the reference value of the first maximum value register 51, then the reference value of the first maximum value register 51 is updated with the evaluation value. On the other hand, when the evaluation value is lower than the reference value of the first minimum value register 52, the reference value of the first minimum value register 52 is updated with the evaluation value. Otherwise, when the value of the first minimum value register 52≦the current evaluation value≦the value of the first maximum value register 51, the values of the registers are not updated.

(19) If it is determined that no motion is involved in any of the frames #0 to #19, the count value of the reference value calculation/updating counter is incremented by one. If motion is detected in one of the frames 1 to N, then the reference value calculation/updating counter is reset to 0.

(20) If the operations described in paragraphs (18) and (19) are performed until the count value of the reference value calculation/updating counter reaches a predetermined integer M, then the same operation as that described in paragraph (18) is performed successively for the frames #0 to #19 again. Further, for each frame, a value obtained by adding $\alpha$ to the value of the first maximum value register 51 is stored into the second maximum value register 55, and another value obtained by subtracting $\beta$ from the value of the first minimum value register 52 is stored into the second minimum value register 56. In short, the reference value of the second maximum value register 55 and the reference value of the second minimum value register 56 are updated here. If some motion is detected, then the count value of the reference value calculation/updating counter is cleared to 0, and updating of the reference values is performed again.

(21) If no motion is detected from any of the frames #0 to #19 while the count value of the reference value calculation/updating counter is M and the registers 55 and 56 of all of the motion detection blocks 41-0 to 41-19 are updated, then the count value of the reference value calculation/updating counter is reset to 0.

In short, each time a situation wherein no motion is involved in any of the frames occurs successively by M times (if the number of frames is N, the situation wherein no motion is involved occurs successively for a period corresponding to N×M fields), the reference values of the second maximum value register 55 and the second minimum value register 56 are automatically updated. <7> Construction of the Motion Detection Section of the Microcomputer (Part 2)

Figure 10:
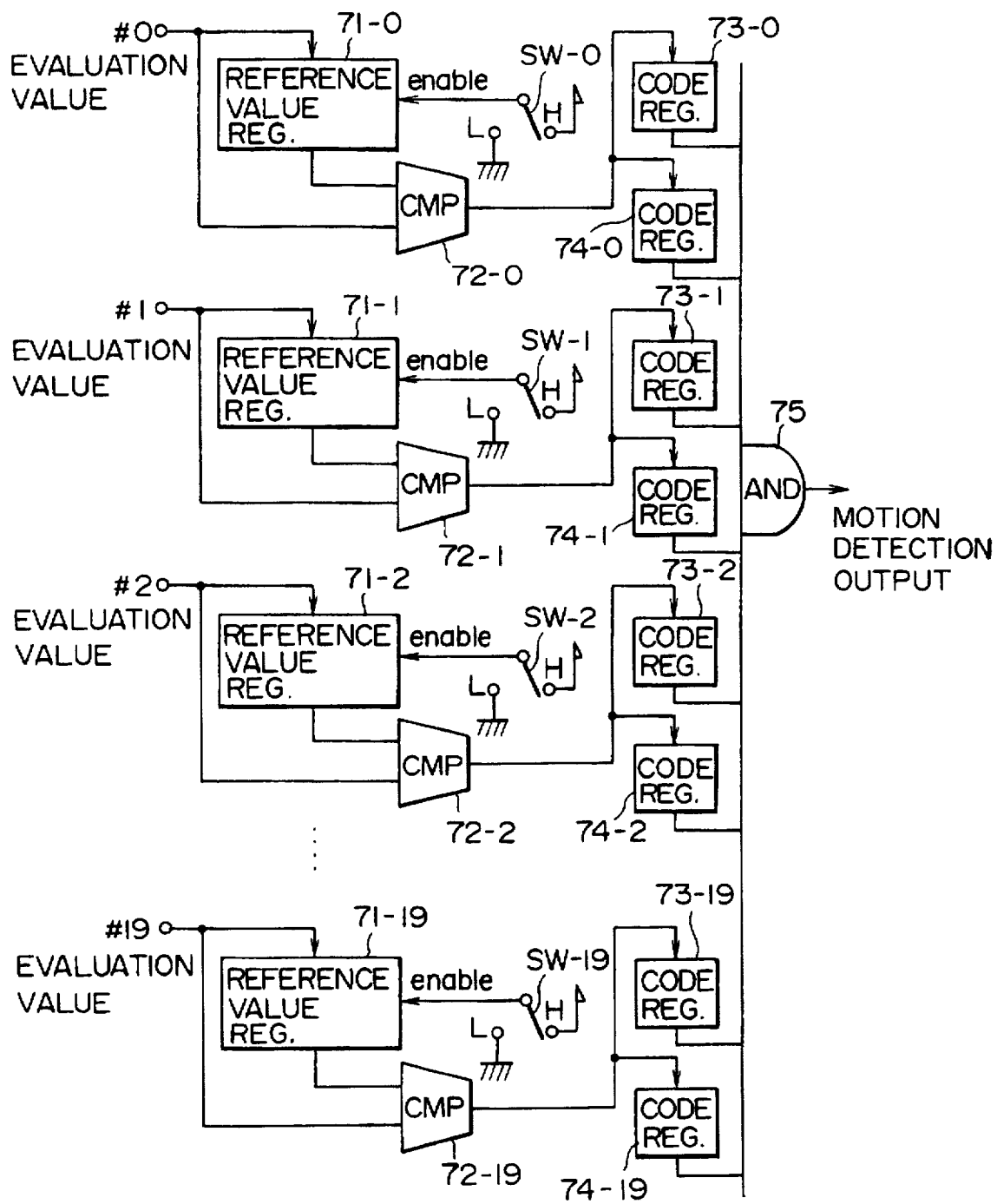
FIG. 10 is a block diagram showing another form of the construction of the motion detection section of the microcomputer.

FIG. 10 shows another form of the construction of the motion detection section of the microcomputer 17. The form shown can be employed in such an environment wherein no definite image variation is involved in the field of view of a video camera in a regular condition as, for example, indoors.

Referring to FIG. 10, the motion detection section shown includes reference value registers 71-0 to 71-19 for storing reference values for each frame, comparators 72-0 to 72-19 for comparing a currently inputted evaluation value with values stored in the reference value registers 71-0 to 71-19, respectively, switching circuits SW-0 to SW-19, code registers 73-0 to 73-19 for storing the signs of outputs of the comparators 72-0 to 72-19, respectively, code registers 74-0 to 74-19 for storing the signs of the outputs of the comparators 72-0 to 72-19, respectively, and an AND gate 75 for logically ANDing outputs of the code registers 73-0 to 73-19 and 74-0 to 74-19.

Each of the reference value registers 71-0 to 71-19 stores an evaluation value when a corresponding one of the switching circuits SW-0 to SW-19 is connected to the L level. Here, the reason why one register is provided for each one frame for storing an evaluation value is described with reference to FIGS. 11A to 11C.

FIG. 11A illustrates an example of a possible maximum value of an evaluation value inputted from the evaluation value detection block 16 in an environment wherein no definite image variation is found in the field of view of a video camera in a regular condition, and FIG. 11B illustrates an example of a possible minimum value of such evaluation value. The evaluation value is formed from 2 bytes. Since the lower 4 bits are variable components by noise or the like, they are common to the maximum and minimum values of FIGS. 11A and 11B. The twelfth to seventh bits are fixed values similarly common to the maximum and minimum values of FIGS. 11A and 11B. In other words, only the fifth and sixth bits may possibly have different values between the maximum and minimum values of FIGS. 11A and 11B. Therefore, a single value rounded to one byte as seen in FIG. 11C is used as the evaluation values to be stored into the reference value registers 71-1 to 71-N.

Referring back to FIG. 10, the code registers 73-0 to 73-19 and 74-0 to 74-19 normally remain in a holding state except when each of them stores an output of a corresponding one of the comparators 72-0 to 72-19. Contents of data to be latched by the code registers 73-0 to 73-19 and 74-0 to 74-19 will be hereinafter described.

The data stored in the code registers 73-0 to 73-19 and 74-0 to 74-19 are sent to the AND gate 75. When the output of the AND gate 75 exhibits the L level, it is determined that some motion is involved in the photographic object in the screen, but when the output of the AND gate 75 exhibits the H level, it is determined that no motion is involved. In short, when some motion is involved in the photographic object in at least one of the frames, it is determined that some motion is involved in the photographic object in the screen.

<8> Flow of the Motion Detection Processing (Part 2)

Subsequently, a flow of motion detection processing where the motion detection section is constructed in such a manner as shown in FIG. 10 will be described. A general flow of the motion detection processing here is the same as that of FIG. 7. However, since processing in each step is somewhat different, description will be given principally of such differences. It is to be noted that the processing in steps S1 and S2 is performed when the supervisory area is normal. In other words, a user will supervise the screen of the monitor apparatus 3 and executes the processing in steps S1 and S2 while confirming that the screen is normal.

First in step S1, initialization is performed. Here, similarly as with the construction shown in FIG. 6, setting of the number of peaks (one, three or the like) of the H-peak hold circuit of FIG. 2 and so forth is performed.

Then in step S2, a reference value for motion detection is calculated for each frame. This is performed by setting the switching circuits SW-0 to SW-19 successively to the L position for each one field period and storing an evaluation value of each frame into a corresponding one of the reference value registers 71-0 to 71-19. After the storage processing is completed, the switching circuits SW-0 to SW-19 are set to the H positions so that the values of the reference value registers 71-0 to 71-19 may be held.

The calculation of the reference values is completed thereby. In short, since calculation of reference values are completed by one operation for each frame, where the number of frames is N, the calculation is completed in a period of N fields. In contrast, where the construction of FIG. 6 is employed, since a maximum value and a minimum value are calculated by m times for each frame, the calculation is completed in a period of N×m fields. After the calculation of reference values is completed, the values of all of the code registers 73-1 to 73-N and 74-1 to 74-N are set to H.

In next step S3, updating of the reference values and automatic tracking are performed similarly as in the construction of FIG. 6. However, since the automatic tracking method itself is the same as in the construction of FIG. 6, description only of detection of motion and updating of reference values will be given here to avoid redundancy.

In step S3, the operations described in paragraphs (1) to (5) below are performed for each frame to perform detection of motion and updating of reference values.

(1) An evaluation value for an arbitrary frame is inputted.

(2) X0-$\beta$ to X19-$\beta$, which are values obtained by subtracting $\beta$ from values X0 to X19 of the reference value registers 71-0 to 71-19, are determined as reference values Y0 to Y19 for the reference value registers 71-0 to 71-19, respectively, and they are compared with current evaluation values Z0 to Z19 of the individual frames, respectively. Then, for example, with the frame #0, if a relationship of Y0$\leq$Z0 is satisfied, then it is determined that no motion is involved in the frame #0 (output: H), but if another relationship of Y0>Z0 is satisfied, then it is determined that some motion is involved in the frame #0 (output: L). This output is stored into the code register 73-0. It is to be noted that $\beta$ may be, for example, 08h.

Further, X0+$\alpha$ to X19+$\alpha$, which are obtained by adding $\alpha$ to the values X0 to X19 of the reference value registers 71-0 to 71-19, are determined as reference values Y0' to Y19' for the reference value registers 71-0 to 71-19, respectively, and they are compared with the current evaluation values Z0 to Z19 of the individual frames, respectively. Then, for example, with the frame #0, if a relationship of Y0'<Z0 is satisfied, then it is determined that some motion is involved in the frame #0 (output: L), but if another relationship of Y0'$\geq$Z0 is satisfied, then it is determined that no motion is involved in the frame #0 (output: H). This output is stored into the code register 74-0. It is to be noted that $\alpha$ may be, for example, 08h.

(3) When the detection output of the AND gate 75 is the L level, processing of displaying a frame, in which motion has been detected, blinking with a blank frame, processing of rendering the alarm apparatus operative and processing of placing the video tape recorder into a recording mode are performed in parallel.

(4) When the detection output of the AND gate 75 is the H level, the current evaluation value is stored into the reference value register 71-0. Consequently, if no motion has been detected, then the reference value of the reference value register 71-0 is updated. However, where the number of frames is, for example, 20, if the reference values are updated in this manner, then they are updated after each period of 20 fields, and accordingly, for example, when a person at a central portion of the screen is approaching from a long distance, since the variation in evaluation value is moderate, the reference values are updated after each such 20 field period, resulting in failure to detect motion of the person. Therefore, preferably a timer is started simultaneously with starting of motion detection processing and an operation of updating the reference values of the reference value registers when no motion is detected is performed after each fixed period of time.

(5) The operations described above are performed for each frame, and after the operations for all of the frames are completed, they are repeated again from the first frame.

The present invention can be suitably applied to such systems as given in paragraphs (1) to (4) below:

(1) Automatic supervisory systems for an invader, fire, an accident and so forth;

(2) Systems wherein limiters for motion detection are set from critical product samples and an appearance inspection of products is performed;

(3) Systems wherein a video tape recorder with a camera is set to a desired angular range and, as soon as a moving body enters the angular range, recording of the video tape recorder is started to realize save of the power and outdoor recording while a user of the video tape recorder is absent; and (4) Interphone systems.

While the preferred embodiments of the present invention are described above, the present invention is not limited to the specific embodiments, but the embodiments can be modified in various forms in accordance with the spirit and scope of the present invention and those modifications shall not be excluded from the scope of the present invention. For example, the integration in a vertical direction in the apparatus of FIG. 2 need not necessarily be performed, but a peak in a frame may be outputted directly as an evaluation value. Further, not the Y signal but the primary color signal of R, G or B or the color difference signal of R-Y or B-Y may be used. Further, while the motion of the video camera is limited to panning in the embodiments described above, only if the video camera images a predetermined area, not only linear motion such as panning or tilting but also such motion as to draw a curve or a circle may be used for the imaging.

What is claimed is:

1. A video camera system, comprising:

an imaging apparatus; and a data processing apparatus for processing data using an output of said imaging apparatus;

said data processing apparatus including extraction means for extracting a video signal of each of a plurality of areas of an image, calculation means for calculating an evaluation value of the image for each of the areas using an output of said extraction means, storage means for calculating a reference value based on the evaluation value obtained when said imaging apparatus images an ordinary state and storing the reference value, detection means for comparing the reference value stored in said storage means with a current evaluation value for each of the areas to detect motion of the image, and control means for controlling a position of said imaging apparatus so that, when said detection means detects motion of the image, the area in which the motion has been detected is positioned at a central portion of the field of view of said imaging apparatus, wherein said detection means is an array comprised of a plurality of independent processing means, each processing means comparing the evaluation value and the reference value for a different area independent of other processing means.

2. A video camera system according to claim 1, wherein said calculation means includes a means for integrating in a vertical direction peak values of said video signal in a horizontal direction from the output of said extraction means.

3. A video camera system according to claim 1, wherein said data processing apparatus further includes an updating means for updating the reference value stored in said storage means in response to a variation of the evaluation value of each of the areas in an ordinary state.

4. A video camera system according to claim 1, wherein said plurality of areas are frames of a video screen, and wherein each processing means is a microprocessor for comparing a respective evaluation value and a respective reference value of a respective frame.

5. A video camera system according to claim 4, wherein each microprocessor compares maximum and minimum values of the respective evaluation value for said respective frame of a current video screen and maximum and minimum values of the respective reference value for said respective frame of a previous video screen.

6. A video camera system according to claim 5, wherein said storage means varies said reference value to prevent erroneous detection of a variation in luminance.

7. A video camera system according to claim 1, wherein said calculation means comprises slice circuit means for outputting said video signal when a level of said video signal is between two predetermined slice levels and integration circuit means for integrating said video signal output from said slice circuit means.

8. A video camera system according to claim 1, wherein said calculation means comprises comparison circuit means for outputting said video signal is higher than a predetermined reference level and counting means for counting the number of pixels in said video signal output from said comparison circuit means.

9. A video camera system according to claim 1, wherein said control means calculates an angular difference between said central portion of the field of view and said area in which the motion has been detected.

10. An automatic tracking method for a video camera system which includes an imaging apparatus, and a data processing apparatus for processing data using an output of said imaging apparatus, comprising the steps of:

extracting a video signal for each of a plurality of areas of the field of view of said imaging apparatus;

calculating an evaluation value of an image for each of the areas based on the video signal;

calculating a reference value based on the evaluation value of the image for each of the areas when said imaging apparatus images an ordinary state;

storing the reference value;

comparing the reference value with a current evaluation value to detect motion of the image using an array of independent processors, each processor comparing a respective reference value with a respective evaluation value for a different area independent of other processors; and controlling a position of said imaging apparatus so that the area in which the motion has been detected may be positioned at a central portion of the field of view of said imaging apparatus.

11. An automatic tracking method according to claim 10, wherein said step of comparing compares a respective evaluation value and a respective reference value of a respective frame.

12. An automatic tracking method according to claim 10, wherein said step of comparing compares maximum and minimum values of the respective evaluation value for said respective frame of a current video screen and maximum and minimum values of the respective reference value for said respective frame of a previous video screen.

13. An automatic tracking method according to claim 10, wherein said step of calculating said reference value varies said reference value to prevent erroneous detection of a variation in luminance.

* * * * *